United States Patent

Assink et al.

Patent Number: 5,871,784
Date of Patent: Feb. 16, 1999

[54] HEAT STAKING APPARATUS

[75] Inventors: Kenneth Assink, Holland; Mark J. Feenstra, Grand Haven, both of Mich.

[73] Assignee: J. R. Automation Technologies, Inc., Holland, Mich.

[21] Appl. No.: 482,745

[22] Filed: Jun. 7, 1995

[51] Int. Cl.$^6$ ..................................................... B23P 11/00

[52] U.S. Cl. .......................... 425/383; 425/392; 425/403; 264/249; 29/243.5; 29/509

[58] Field of Search ..................................... 425/383, 384, 425/403, 112, 392; 264/249; 29/243.5, 509

[56] References Cited

U.S. PATENT DOCUMENTS

| | | | |
|---|---|---|---|
| 551,079 | 12/1895 | Force et al. | 264/249 |
| 1,200,992 | 10/1916 | Searles | 264/249 |
| 1,370,690 | 3/1921 | Jacobs | 112/660 |
| 2,343,983 | 3/1944 | Knowlton | 218/29 |
| 2,634,012 | 4/1953 | Copeman | 215/38 |
| 2,689,400 | 9/1954 | Mirando | 425/521 |
| 2,705,346 | 4/1955 | Schlabach et al. | 264/249 |
| 2,705,522 | 4/1955 | Kamborian | 154/41 |
| 2,739,360 | 3/1956 | Voss | 22/31 |
| 2,751,963 | 6/1956 | Valentine | 154/1.8 |
| 2,985,222 | 5/1961 | Marty et al. | 154/4 |
| 3,308,225 | 3/1967 | Wells | 264/249 |
| 3,325,329 | 6/1967 | Bolesky | 156/216 |
| 3,419,297 | 12/1968 | Diepenhorst et al. | 264/249 |
| 3,438,108 | 4/1969 | Nash | 29/91.5 |
| 3,439,379 | 4/1969 | Graf | 18/1 |
| 3,489,829 | 1/1970 | Lippert | 264/93 |
| 3,551,239 | 12/1970 | Newton | 156/213 |
| 3,586,566 | 6/1971 | Van Vleet et al. | 156/293 |
| 3,640,655 | 2/1972 | Wallace | 425/109 |
| 4,071,393 | 1/1978 | Amphlett | 156/353 |
| 4,174,988 | 11/1979 | Moore et al. | 156/213 |
| 4,615,668 | 10/1986 | Matsuda | 425/145 |
| 4,619,725 | 10/1986 | Muraishi et al. | 156/182 |
| 4,633,559 | 1/1987 | Loren | 29/243.5 |
| 4,755,120 | 7/1988 | Onnenberg et al. | 425/125 |
| 4,763,399 | 8/1988 | Tsukayama et al. | 29/509 |
| 4,767,298 | 8/1988 | Bocchicchio et al. | 425/112 |
| 4,784,591 | 11/1988 | Ackermann | 425/116 |
| 4,793,784 | 12/1988 | Belleville et al. | 425/111 |
| 4,793,793 | 12/1988 | Swenson et al. | 425/503 |
| 4,818,331 | 4/1989 | Shimada | 156/485 |
| 5,018,957 | 5/1991 | Assink et al. | 425/112 |

FOREIGN PATENT DOCUMENTS

| | | |
|---|---|---|
| 5325976 | 4/1976 | Japan. |
| 5286068 | 10/1978 | Japan. |
| 5680421 | 12/1979 | Japan. |

Primary Examiner—David W. Wu
Attorney, Agent, or Firm—Price, Heneveld, Cooper, DeWitt & Litton

[57] ABSTRACT

A heat staking apparatus includes a workpiece support and a moveable support plate having a planar surface spaced from the workpiece support. A plurality of extensible components are supported on the support plate by holders that slideably engage the planar surface in a manner allowing horizontal adjustment in an infinite number of directions within a given area on the plane. The extensible components include staking tools configured to heat stake a workpiece located on the workpiece support. The hot staking apparatus further includes a plurality of adjustable hot air heater assemblies, one for each extensible cylinder. Each hot air assembly includes a holder adjustably secured to the support plate. The holder includes opposing members, one of which is spring-loaded for removably releasably engaging and holding the respective hot air heater assembly.

37 Claims, 3 Drawing Sheets

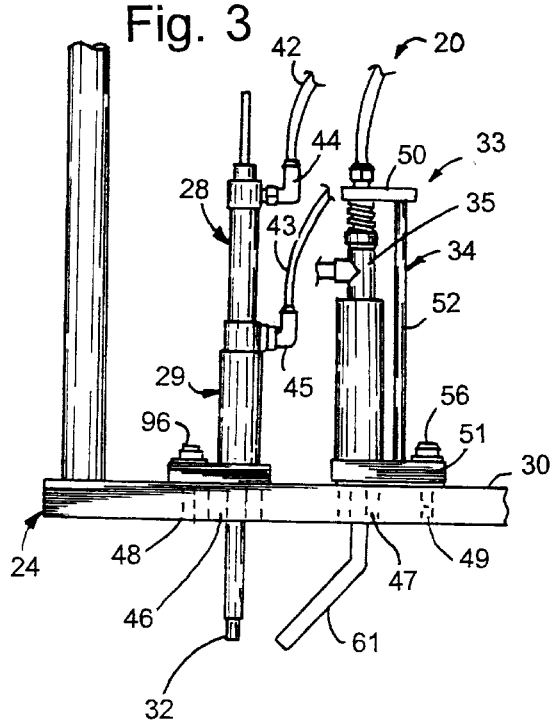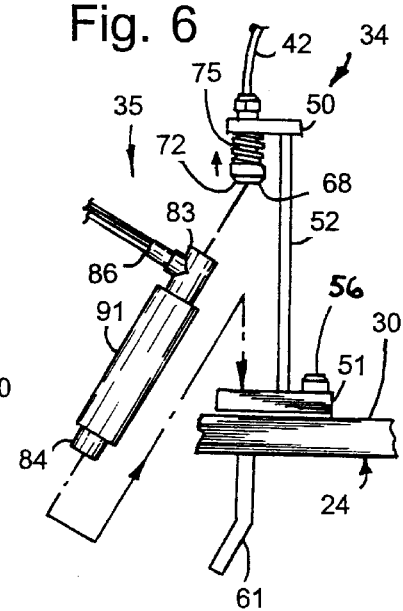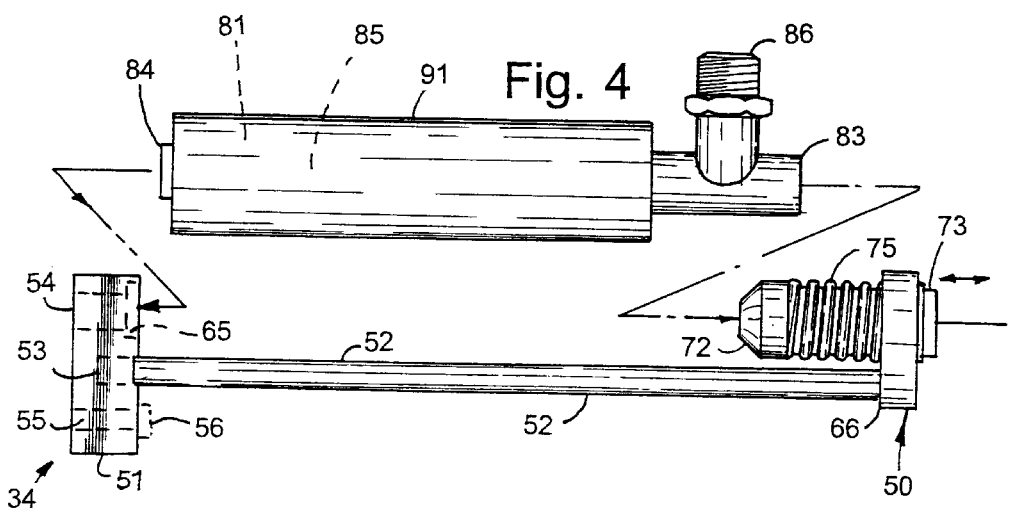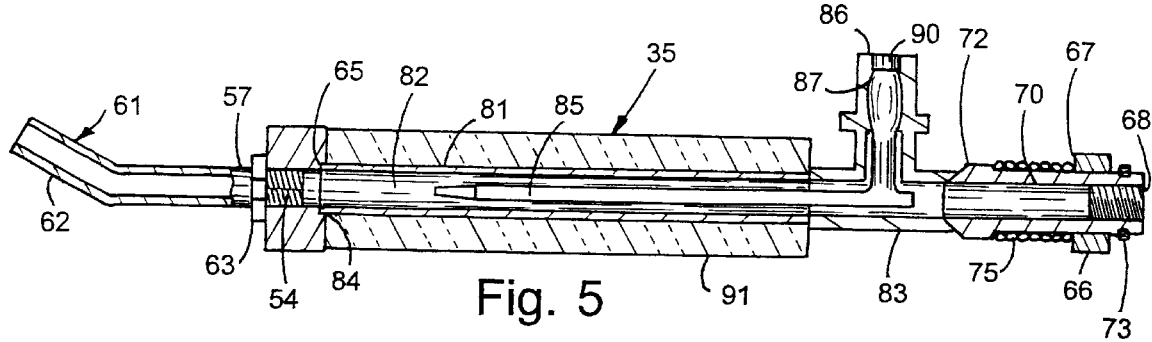

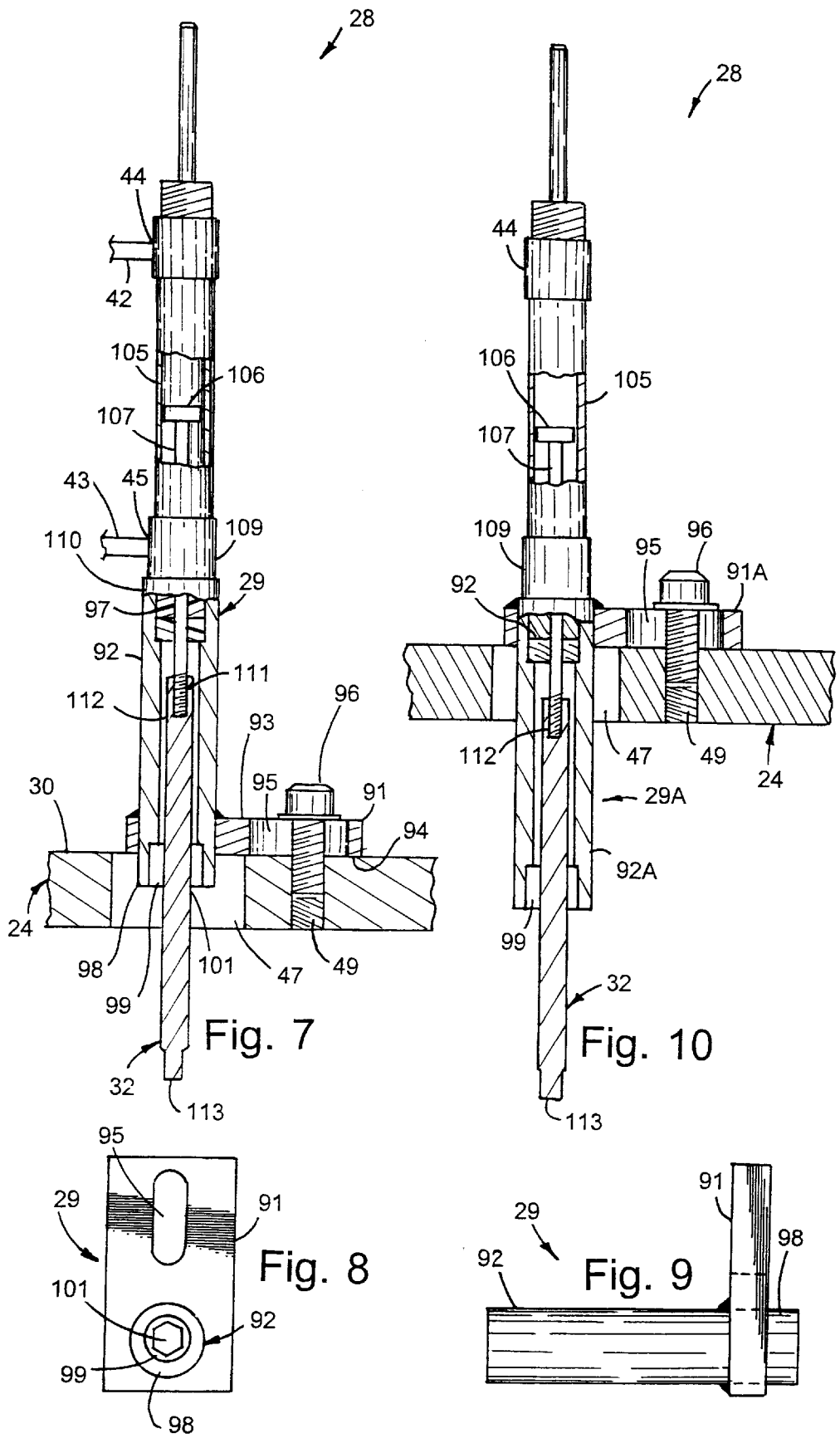

5,871,784

HEAT STAKING APPARATUS

BACKGROUND OF THE INVENTION

The present invention relates to heat staking apparatus, and more particularly relates to an apparatus for heat staking parts together by heating and then forming plastic protrusions extending from one part into the other.

It is known to extend a plastic protrusion through an aperture, to heat the protrusion to a formable state, and then to form and cool the protrusion with a staking tool into an interlocking rivet-like headed fastener. In the automotive industry, heat staking apparatus are typically configured to assemble specific parts for a particular model of vehicles. It is desirable to run parts for related models that are similar but not identical on the same heat staking apparatus, however the similar parts often do not have exactly the same shape or pattern of protrusions, such that a particular heat staking apparatus cannot run both types of parts without considerable changeover. For this reason, usually a second heat staking apparatus is purchased. However, the additional machinery is expensive and also consumes precious floor space, and further requires additional maintenance. Additionally, plastic components may vary dimensionally from the designed shape, such that fine tuning of the relative locations of the heat staking tools is necessary, particularly during start-up.

Another problem is that the heater elements used to heat the hot air sometimes burn out. Usually, heater elements are positioned as close as possible to the point of use to provide maximum control over heated air, and to prevent loss of heat as the heated air moved from the heater to the protrusion to be heated. However, the area around the heat staking tools is often if not usually congested, particularly where there are multiple staking tools and/or multiple heaters. Further, maintenance people usually want to allow the heat staking apparatus to cool before removing the burned out heater elements, since the burned out heater elements must be unfastened or unbolted, and manipulated for removal. Unfortunately, this wastes production time.

Thus, a heat staking apparatus is desired solving the aforementioned problems.

SUMMARY OF THE INVENTION

In one aspect, the present invention includes a heat staking apparatus having a workpiece support and a support plate defining a plane spaced from the workpiece support. A plurality of extensible components are supported on the support plate, at least one of the extensible components being adjustably supported on the support plate for movement in a plurality of directions along the plane. The extensible components include staking tools configured to heat stake a workpiece located on the workpiece support. By adjusting the at least one extensible component, the heat staking apparatus can be adjusted for use on similar parts, even though the parts are not identical. Also, the heat stake apparatus can be readily adjusted on-site to accommodate product variations.

In another aspect, the hot staking apparatus includes a support plate, a hot air heater assembly, and a holder secured to the support plate. The holder includes opposing members having surfaces configured to removably releasably engage and hold the hot air heater assembly. The removability of the hot air heater assembly facilitates replacement and repair.

These and other features, advantages and objects of the present invention will be further understood and appreciated by those skilled in the art by reference to the following specification, claims and appended drawings.

BRIEF DESCRIPTION OF THE DRAWINGS

FIG. 3 is an enlarged fragmentary side view of a hot air heater assembly and an extensible staking tool of the heat staking apparatus shown in FIG. 2;

FIG. 4 is an exploded, enlarged side view of the heater assembly shown in FIG. 3;

FIG. 5 is a cross-sectional side view of the heater assembly shown in FIG. 3;

FIG. 6 is a side view of the heater assembly shown in FIG. 3 including the method of installation and removal;

FIG. 7 is an enlarged fragmentary side view of the extensible staking tool shown in FIG. 3;

FIGS. 8–9 are bottom and side views of the tool holder shown in FIG. 7; and

FIG. 10 is an enlarged fragmentary side view of a modified extensible staking tool comparable to that shown in FIG. 3.

DETAILED DESCRIPTION OF PREFERRED EMBODIMENT

Figure 1:
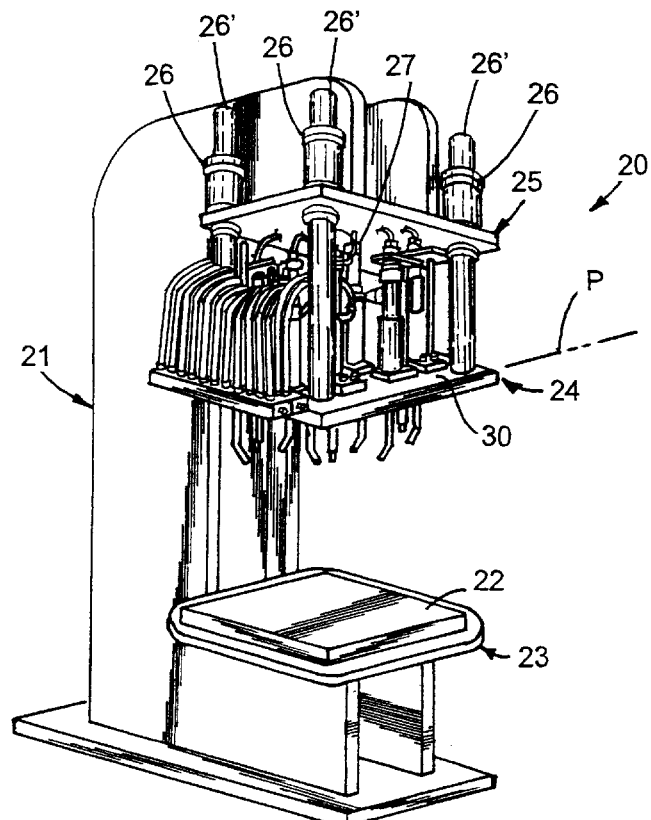
FIG. 1 is a perspective view of a heat staking apparatus embodying the present invention.
Figure 2:
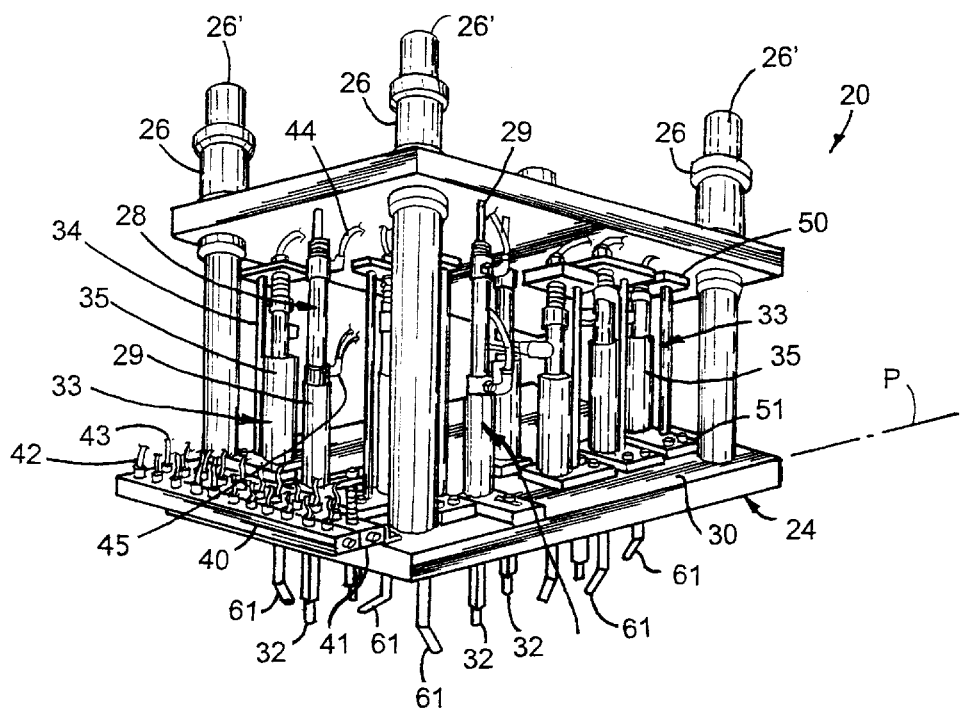
FIG. 2 is an enlarged fragmentary side view of the heat staking apparatus shown in FIG. 1.

A heat staking apparatus 20 (FIG. 1) includes a C-shaped frame 21, a workpiece support 22 supported on a lower platen 23 of the frame 21, and a vertically-movable support plate 24 movably supported on an upper platen 25 of the apparatus 20. The support plate 24 is operably supported for vertical movement relative to upper platen 25 by guides 26 and guide rods 26', and at least one actuator or extensible component 28 (FIGS. 2 and 3) is operably connected to support plate 24 and platen 25 for operating support plate 24. The support plate 24 includes an upper surface 30 defining a plane P spaced from the workpiece support 22, and the plurality of extensible components 28 are horizontally adjustably supported on the support plate 24 by holders 29. Specifically, the holders 29 are configured to slidably adjustably engage the planar surface 30 on the support plate 24. The holders 29 are horizontally slidably adjustable to an infinite number of positions, such that the extensible components can be readily adjusted on-site to accommodate product variation or to allow quick changeover to run similar but non-identical product or workpieces. The extensible components 28 include staking tools 32 configured to heat stake a workpiece located on the workpiece support 22.

The hot staking apparatus 20 further includes a plurality of adjustable hot air heater assemblies 33, one for each extensible component 28. Each hot air assembly 33 includes a holder 34 (FIG. 6) adjustably secured to the support plate 24, and further includes a heater unit 35 supported by the holder 34. The heater holders 34 include opposing members 50 and 51, one of which is spring-loaded so that the heater unit 35 is removably releasably held to facilitate quick replacement of a burned out heater assembly or heater element.

Support plate 24 (FIG. 2) is secured to the bottom end of guide rods 26' at its corners. First and second compressed air manifolds are operably connected to support plate 24 for extending and retracting the extensible components 28. Pairs of compressed air lines 42 and 43 extend from the manifolds respectively to the opposing sides of each extensible component 28, and are operably connected thereto by connectors 44 and 45, respectively. Support plate 24 (FIG. 3) includes a plurality of paired apertures 46 and 47 and also threaded holes 48 and 49 positioned proximate apertures 46 and 47, respectively, the purpose of which is described below.

Heater holder 34 (FIGS. 4–6) includes opposing top and bottom members 50 and 51 supported in a spaced apart condition by a spacer rod 52. Bottom member 51 includes a first hole 53 (FIG. 4) generally centrally located in member 51 for mateably engaging the lower end of rod 52. Rod 52 is secured thereto by welding or threaded engagement. Bottom member 51 also includes holes 54 and 55 located on opposing sides of rod-receiving hole 53. A bolt 56 extends through hole 55 into threaded engagement with hole 49 (FIG. 3) in support plate 24 to frictionally retain heater holder 34 to the support plate 24 in an adjusted position. Hole 54 includes a threaded section in its lower end for receiving an upper end 57 of a hot air distribution tube 61. Tube 61 includes a bent end section 62 for directing hot air in a predetermined direction. A pipe coupling connector 63 engages tube 61 and locks tube 61 in a desired angular orientation on bottom member 51. It is contemplated that various attachment methods can be used to secure tube 61 to bottom member 51. Preferably, the tube 61 sealingly engages bottom member 51 to prevent unacceptable loss of heated air. A ring-shaped recess 65 is formed in the top section of hole 54 for receiving the lower end 84 of heater unit 35, as described below.

Upper member 50 (FIG. 4) includes a block 66 secured to rod 52. A hole 67 (FIG. 5) extends through block 66, and an adapter 68 is slidably positioned therein. In particular, adapter 68 includes an elongated cylindrically-shaped tubular section 70 that mateably, slidably engages hole 67, and further includes an enlarged headed end 72 oriented toward bottom member 50 for mateably engaging an upper end of heater unit 35. A passageway extends longitudinally through adapter 68. A retainer 73 is attached to the upwardly protruding end of elongated section 70 to retain adapter 68 in hole 67. A coil spring 75 is positioned on elongated section 70 between headed end 72 and block 66 to bias adapter 68 toward bottom member 51.

Heater unit 35 (FIG. 5) includes a tube 81 defining a passageway 82 for communicating heated air therethrough. The upper and lower ends 83 and 84 of heater unit 35 are configured to mateably sealingly engage headed end 72 of adapter 68 and the recess 65 of bottom member 51, respectively. The length of tube 81 is such that heater unit 35 is compressively held in position between spring 75 and adapter 68 once heater unit 35 is placed in position between top and bottom members 50 and 51. A heater element 85 is positioned in tube 81. A quick disconnect multi-wire connector 86 is positioned in adapter 68 and extends laterally from inside of tube 81 near the upper end 83. Electrical wires 87 extend from heater element 85 along with a temperature sensor wire, which wires are connected to the pins 90 on the connector 86. An insulating sleeve 91 of cork, foam or like material is positioned on tube 81 to insulate and thus maintain a constant temperature of heater unit 35 and to reduce thermal energy loss.

To install heater unit 35 (FIGS. 4 and 6), tube end 83 is fitted against the frustoconically-shaped headed end 72 of adapter 68. Tube 81 is then urged against adapter 68 to compress spring 75. This biases adapter 68 upwardly away from bottom member 51 so that there is room between top and bottom members 50 and 51 to position heater unit 35 and in particular tube 81 therebetween. Tube 81 is then released, which allows spring 75 to move adapter 68 toward bottom member 50, thus retainingly compressing heater unit 35 therebetween. Tube 81 is thus held compressively between top and bottom members 50 and 51. Connector 86 can be electrically connected before or after installation of a new heater unit 35.

Heater unit 35 can be made adjustable by providing clearance within the holes in bottom member 51 of bolt 56. In such case, the bolt 56 can be loosened, allowing the relative horizontal position of heater unit 35 to be adjusted to a desired position. Thereafter, bolt 56 is retightened to hold bottom member 51 (and in turn, heater unit 35) in place. It is noted that heater unit 35 can be adjusted to an infinite number of horizontal positions to the extent that the configuration will allow. Also, tube 61 can be angularly adjusted to direct the flow of air exiting from tube 61 toward the end of staking tool 32.

Extensible component holder 29 (FIGS. 8–9) includes a flange 91 and a tube section 92 welded to flange 91 and extending generally perpendicularly thereto. Flange 91 includes upper and lower surfaces 93 and 94 (FIG. 7) that are generally planar and parallel, such that either of the surfaces can be mateably engaged with the top or bottom of support plate 24. A slot 95 extends along flange 91. A bolt 96 extends through slot 95 and is threaded into hole 48 in support plate 24 to frictionally secure holder 29 in a desired position on support plate 24.

Tube section 92 (FIG. 7) includes an internally threaded upper end 97 and a lower end 98 configured to receive an insert bushing 99. Insert bushing 99 includes a hex-shaped hole 101 for non-rotatingly and slidably receiving the heat stake tool 32. Extensible component 28 includes a pneumatic cylinder 105 and a piston 106 operably positioned therein. A rod 107 extends from piston 106 through a lower end 109 of cylinder 105. Lower end 105 includes a threaded exterior end surface 110 for mateably engaging an internally threaded upper end 97 of tube section 92. Rod 107 includes a threaded end section 111 for mateably engaging the upper end 112 of tool 32. The lower end of tool 32 includes a dome-shaped recess 113 for heat forming the plastic protrusion on the workpiece that it engages.

As shown in FIG. 7, tube section 92 extends partially into aperture 47 in support plate 24. Aperture 47 is enlarged to permit infinite X-Y horizontal adjustment of the horizontal planar position of extensible component 28 within the limited area of aperture 47, or in other words until tube section 92 engages the sides of aperture 47. In a modified arrangement, a tube holder 29A (FIG. 10) includes a tube section 92A identical to tube section 92 that is welded to flange 91 in a substantially lower position on flange 91 than was tube section 92. This causes the location of the extensible cylinder 105 attached to tube section 92A to be lower relative to support plate 24 and in turn locates staking tool 32 closer to the workpiece or worksurface. Notably, either of holders 29 and 29A can be mounted against either the top or bottom surface of support plate 24. This provides further adjustability to the arrangement.

Thus, a heat staking apparatus includes a readily removable and adjustable staking tool holder and assembly, and a readily removable and adjustable hot air heater unit and assembly. In the foregoing description, it will be readily appreciated by those skilled in the art that modifications may be made to the invention without departing from the concepts disclosed herein. Such modifications are to be considered as covered by the following claims, unless these claims by their language expressly state otherwise.

The embodiments of the invention in which an exclusive property or privilege is claimed are defined as follows:

1. A heat staking apparatus comprising:
   a workpiece support;
   a support plate defining a plane spaced from said workpiece support; and
   a plurality of extensible components supported on said support plate, at least one of said extensible components being adjustably supported on said support plate for movement in a plurality of directions along said plane to permit horizontal adjustment of the position of said at least one adjustably supported extensible component, said extensible components including staking tools configured to heat stake a workpiece located on the workpiece support.

2. A heat staking apparatus as defined in claim 1 wherein said extensible components are infinitely adjustable within a predetermined area defined on said support plate.

3. A heat staking apparatus as defined in claim 1 including a holder for supporting said at least one extensible component on said support plate.

4. A heat staking apparatus as defined in claim 3 wherein said support plate includes a surface defining said plane, and said holder adjustably engages said surface.

5. A heat staking apparatus as defined in claim 4 wherein said holder includes a flange slideably engaging said surface.

6. A heat staking apparatus as defined in claim 5 wherein said flange includes a slot, and including a fastener extending through said slot into engagement with said support plate for frictionally securing said holder to said support plate.

7. A heat staking apparatus as defined in claim 6 including a plurality of additional holders, each being configured to operably support one of said extensible components.

8. A heat staking apparatus as defined in claim 3 wherein said holder includes a tube attached to said flange, said tube being configured to operably engage and support said one extensible component.

9. A heat staking apparatus as defined in claim 8 wherein said tube includes threads for threadably engaging said one extensible components.

10. A heat staking apparatus as defined in claim 1 including a second support plate spaced from said first mentioned support plate, said plurality of extensible components including a cylinder located substantially between said first-mentioned support plate and said second support plate.

11. A heat staking apparatus as defined in claim 1 including a plurality of heaters supported by said support plate for heating predetermined locations on a part supported on the workpiece support.

12. A heat staking apparatus as defined in claim 11 including a plurality of heater holders for adjustably supporting said plurality of heaters.

13. A heat staking apparatus as defined in claim 12 wherein said heater holders releasably engage said heaters without the use of separate fasteners.

14. A heat staking apparatus as defined in claim 1 wherein one of said workpiece support and said support plate are movable between a part loading position and a heat staking position relative to the other of said workpiece support and said support plate.

15. A heat staking apparatus comprising:
   a workpiece support;
   a support plate defining a plane spaced from said workpiece support;
   a plurality of extensible components supported on said support plate, at least one of said extensible components being adjustably supported on said support plate from movement in a plurality of directions along said plane, said extensible components including staking tools configured to heat stake a workpiece located on the workpiece support;
   a plurality of heaters supported by said support plate for heating predetermined locations on a part supported on the workpiece support; and
   a plurality of heater holders for adjustably supporting said plurality of heaters, said heater holders releasably engage said heaters in a quick disconnect arrangement.

16. A heat staking apparatus comprising:
   a support plate;
   a plurality of extensible cylinders;
   a plurality of holders configured to adjustably support said extensible cylinders on said support plate for adjustment within a predetermined area defined on said support plate to permit horizontal adjustment of the position of said extensible cylinders; and
   a staking tool operably mounted for reciprocating motion to each of said extensible cylinders.

17. A hot staking apparatus as defined in claim 16 wherein said adjustable holder includes a flange slideably engaging said support plate.

18. A hot staking apparatus as defined in claim 17 wherein said flange includes a slot, and including a fastener extending through said slot into engagement with said support plate for holding said adjustable holder on said support plate.

19. A hot staking apparatus as defined in claim 16 including a plurality of air heaters supported by said support plate for heating predetermined areas of a workpiece supported on the workpiece support.

20. A hot staking apparatus as defined in claim 19 including a second support plate located above said first-mentioned support plate, said adjustable holders being located between said first and second support plates.

21. A hot staking apparatus as defined in claim 16 wherein said support plate includes a flat surface, said adjustable holders engaging said flat surface and being adjustably supported thereon.

22. A hot staking apparatus as defined in claim 21 wherein said holders each include an attachment flange configured for attachment to said support plate.

23. A hot staking apparatus as defined in claim 22 wherein said adjustable holder includes a tube attached to said flange.

24. A hot staking apparatus comprising:
   a support plate;
   a hot air heater assembly; and
   a holder secured to said support plate, said holder including opposing members having surfaces thereon configured to removably releasably engage and hold said hot air heater assembly.

25. A hot staking apparatus as defined in claim 24 including additional hot air heater assemblies and a plurality of additional holders for each of said plurality of additional heater assemblies.

26. A hot staking apparatus as defined in claim 24 wherein said opposing members are located at opposing ends of the hot air heater assembly.

27. A hot staking apparatus as defined in claim 26 wherein said opposing members on said holder are configured to releasably engage the opposing ends of said hot air heater assembly without the use of separate fasteners.

28. A hot staking apparatus as defined in claim 27 wherein one of said opposing members includes a spring-loaded adaptor.

29. A hot staking apparatus as defined in claim 28 including an rotatably adjustable air tube attached to one of said opposing members.

30. A hot staking apparatus as defined in claim 24 wherein one of said opposing members includes a spring-loaded adaptor.

31. An apparatus for use on a hot staking machine comprising:
   a holder configured for attachment to a support on the hot staking machine, said holder including spaced apart first and second opposing members;
   a hot air heater assembly having a first end configured to mateably engage the first opposing member and a second end; and
   an adaptor extending from said second opposing member and configured to mateably engage said second end of said hot air heater assembly, said adaptor being moveable to release said hot air heater assembly so that said hot air heater assembly can be readily removed and replaced without disassembly of said hot staking machine.

32. An apparatus as defined in claim 31 wherein one of said opposing members includes a spring-loaded adaptor.

33. An apparatus as defined in claim 31 including a vent tube attached to one of said opposing members.

34. An apparatus as defined in claim 31 wherein said first end of said hot air heater assembly includes a protruding tubular section for mateably engaging said first flange.

35. An apparatus as defined in claim 34 wherein said second end of said hot air heater assembly includes a second tubular section extending from said second end for mateably engaging said adaptor.

36. An apparatus as defined in claim 31 wherein said hot air heater assembly includes a tubular section having an electrical heating element therein and further includes a laterally extending member having electrical leads extending therethrough from said heating element to an exterior of said hot air heating assembly.

37. A heat staking apparatus comprising:
   a support plate;
   a plurality of extensible cylinders;
   a plurality of holders configured to adjustably support said extensible cylinders on said support plate for adjustment within a predetermined area defined on said support plate; and
   a staking tool operably mounted for reciprocating motion to each of said extensible cylinders, wherein said adjustable holder includes a flange slidably engaging said support plate, and said flange includes a slot and a fastener extending through said slot into engagement with said support plate for holding said adjustable holder on said support plate.

* * * * *